UNITED STATES PATENT OFFICE.

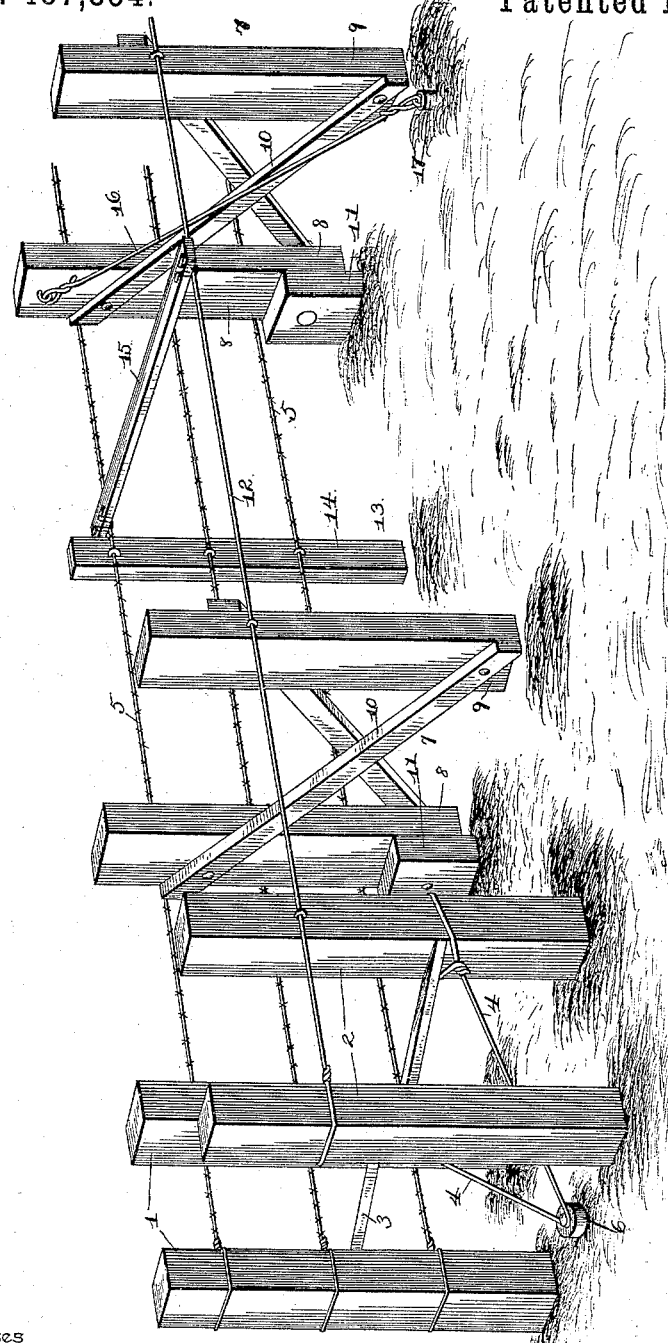

MOSES W. ST. JOHN, OF CEDAR FALLS, IOWA.

WIRE FENCE.

SPECIFICATION forming part of Letters Patent No. 487,354, dated December 6, 1892.

Application filed February 10, 1892. Serial No. 420,986. (No model.)

*To all whom it may concern:*

Be it known that I, MOSES W. ST. JOHN, a citizen of the United States, residing at Cedar Falls, in the county of Black Hawk and State of Iowa, have invented a new and useful Wire Fence, of which the following is a specification.

The invention relates to improvements in barbed-wire fences.

The object of the present invention is to improve the construction of barbed-wire fences and to provide cattle-guards, so that barbed wire may be safely employed without liability of injuring horses and cattle.

The invention consists in the construction and novel combination and arrangement of parts hereinafter fully described, illustrated in the accompanying drawing, and pointed out in the claims hereto appended.

The figure of the drawing is a perspective view of a barbed-wire fence embodying the invention.

Like numerals of reference indicate corresponding parts in the figure of the drawing.

1 and 2 designate four corner-posts, which are supported by braces 3 and wire stays 4 and the outer ones of which have secured to them horizontal barbed fence-wires 5, which are fastened to the end one of the outer posts 1 and which are stapled to the other post 2. The braces 3 are interposed between each pair of posts 1 and 2 and the stay-wires 4 are secured beneath the lower ends of the braces 3 and are attached at their outer end to an anchor 6, of stone or other suitable material.

Four-corner posts are arranged at each end of a completed fence and the fence-wires 5 are supported at intervals by flexible supports 7, consisting of parallel posts 8 and 9 and inclined crossed braces 10, which connect the posts 8 and 9 and are pivoted at the lower ends of the posts 8 and 9 and near the upper ends of the same. The outer post 8 has the fence-wires stapled or otherwise secured to it, and it is pivoted at its lower end to a short post 11, projecting from the ground. The post 9, which is arranged on the inner side of the fence, supports a guard-wire 12, which prevents horses and cattle from running against the barbed wires and being torn or otherwise injured. The guard-wire 12 is connected with the fence-wires at intervals between the flexible supports by fence-stays 13, consisting of a vertical bar 14, having the fence-wire secured to it, and a horizontal bar 15, arranged on and secured to the guard-wire and the top fence-wire.

The guard-wire 12 forms a yielding shield for horses and cattle, and should an animal strike it with much force, which would be sufficient to break it under ordinary circumstances, it will yield, together with the fence-wires, and be forced outward, the flexible supports permitting such a movement on the part of the fence. It will thus be seen that barbed wire may be employed with perfect safety and there cannot be any injury to horses and cattle and that the fence will not be easily broken by animals striking against it.

In order to make the fence sufficiently rigid to prevent it being forced outward by a slight push, the flexible supports 7 are braced at intervals by a wire stay 16, which has its upper end secured to the flexible support and its lower end fastened to a peg or stake 17, which is driven into the ground. Should much force be exerted on the fence, the stake or peg would be readily pulled out of the ground to permit the fence to yield.

The fence in case a horse or other animal should become frightened and plunge against it, is capable of twisting far enough to carry the barbed wires flat against the ground to prevent any liability of the animal coming in contact with them, and after the pressure is removed from the fence the latter will spring back into a vertical position.

What I claim is—

1. In a barbed-wire fence, the combination of horizontal barbed wires, a flexible support comprising parallel posts, the outer one having the barbed wires secured to it and having its lower end pivoted, and inclined crossed braces connecting the posts, and a guard-wire secured to the inner post, substantially as and for the purpose described.

2. In a barbed-wire fence, the combination of horizontal barbed wires, a short post designed to project slightly above the ground, the flexible support pivoted to the short post and comprising parallel posts and crossed braces connecting the posts and pivotally secured to them, a wire stay connected to the flexible support, a stake fastened to the wire stay and designed to be driven into the ground and to be pulled out of the same by a heavy strain upon the fence, and a guard-wire secured to the flexible support, substantially as described.

3. In a barbed-wire fence, the combination of horizontal barbed wires, a short post designed to project slightly above the ground, the flexible support pivoted to the short post and comprising parallel posts and crossed braces connecting the posts and pivotally secured to them, a wire stay connected to the flexible support, a stake fastened to the wire stay and designed to be driven into the ground and to be pulled out of the same by a heavy strain upon the fence, a guard-wire secured to the flexible support, and a fence-stay comprising the vertical bar secured to the horizontal wires and a horizontal bar connected to the guard-wire and to one of the horizontal fence-wires, substantially as described.

In testimony that I claim the foregoing as my own I have hereto affixed my signature in the presence of two witnesses.

MOSES W. ST. JOHN.

Witnesses:
JOHN H. SIGGERS,
H. GOODRICH PIERSON.